US009616821B2

(12) United States Patent
Elharar (10) Patent No.: US 9,616,821 B2
(45) Date of Patent: Apr. 11, 2017

(54) APPARATUS FOR SECURING A MOBILE DEVICE TO A STEERING WHEEL

(71) Applicant: David Elharar, Tel aviv (IL)

(72) Inventor: David Elharar, Tel aviv (IL)

(*) Notice: Subject to any disclaimer, the term of this patent is extended or adjusted under 35 U.S.C. 154(b) by 0 days.

(21) Appl. No.: 14/092,973

(22) Filed: Nov. 28, 2013

(65) Prior Publication Data

US 2015/0144754 A1    May 28, 2015

(51) Int. Cl.
*B60R 11/02* (2006.01)
*F16M 13/02* (2006.01)
*B60R 11/00* (2006.01)

(52) U.S. Cl.
CPC ......... *B60R 11/0241* (2013.01); *F16M 13/02* (2013.01); *B60R 2011/001* (2013.01); *B60R 2011/007* (2013.01); *B60R 2011/0059* (2013.01); *B60R 2011/0068* (2013.01); *B60R 2011/0071* (2013.01)

(58) Field of Classification Search
CPC ............... B60R 11/0241; B60R 11/02; B60R 2011/001; B60R 2011/0056; B60R 2011/0057; B60R 2011/0059; B60R 2011/007; B60R 2011/0068; F16M 13/00; F16M 13/02
See application file for complete search history.

(56) References Cited

U.S. PATENT DOCUMENTS

| | | | |
|---|---|---|---|
| 5,056,822 A | 10/1991 | Shim | |
| 5,992,807 A | 11/1999 | Tarulli | |
| 6,481,684 B1* | 11/2002 | Farmer | B60R 11/0241 248/225.11 |
| 6,888,940 B1* | 5/2005 | Deppen | 379/446 |
| 8,496,144 B2 | 7/2013 | Son | |
| 8,505,792 B1* | 8/2013 | Jansen | B60R 11/0241 224/276 |
| 8,662,362 B1* | 3/2014 | Bastian | H04B 1/3888 224/197 |
| 2007/0029359 A1* | 2/2007 | Smith | B60R 11/02 224/276 |
| 2007/0155439 A1* | 7/2007 | Tsai | B60R 11/0241 455/569.1 |
| 2011/0024470 A1* | 2/2011 | Hajarian | B60R 11/0241 224/276 |

(Continued)

FOREIGN PATENT DOCUMENTS

WO    WO2009/147514    12/2009

OTHER PUBLICATIONS iOmounts iOauto Pro car mount review; by Julie Strietelmeier on Sep. 9, 2013; http://the-gadgeteercom/2013/09/09/iomounts-ioauto-pro-car-mount-review/.

*Primary Examiner* — Ryan Kwiecinski
(74) *Attorney, Agent, or Firm* — Daniel J. Swirsky; AlphaPatent Associates Ltd.

(57) ABSTRACT

The subject matter discloses an apparatus for securing a mobile device to a steering wheel, comprising: a main flap connected to a rear surface of the mobile device, said main flap is made of a rigid material; a holder attached to the main flap, said holder secures the mobile device to the main flap; an elliptic unit extending from the main flap and surrounding the steering wheel. The apparatus may be part of a kit that also comprises a second holder attached to the rear surface of the mobile device, said second holder is in contact with the first holder.

4 Claims, 7 Drawing Sheets

(56) References Cited

U.S. PATENT DOCUMENTS

| | | | | |
|---|---|---|---|---|
| 2012/0080465 A1* | 4/2012 | Son | ............... | B60R 11/02 |
| | | | | 224/276 |
| 2012/0207462 A1* | 8/2012 | Justice | ............ | F16M 11/041 |
| | | | | 396/428 |
| 2012/0223196 A1* | 9/2012 | Musselman | ............ | B60R 11/02 |
| | | | | 248/220.21 |
| 2014/0008405 A1* | 1/2014 | Beaver | ............ | B60R 11/0241 |
| | | | | 224/276 |
| 2014/0191095 A1* | 7/2014 | Le Gette | ............ | F16M 13/00 |
| | | | | 248/176.3 |
| 2014/0191099 A1* | 7/2014 | Schwarz | ............ | F16M 13/005 |
| | | | | 248/309.1 |
| 2014/0353448 A1* | 12/2014 | Army | ............ | F16M 13/00 |
| | | | | 248/316.8 |
| 2015/0054760 A1* | 2/2015 | Amaru | ............ | G02B 27/0101 |
| | | | | 345/173 |

* cited by examiner

APPARATUS FOR SECURING A MOBILE DEVICE TO A STEERING WHEEL

FIELD OF THE INVENTION

The present invention relates to an apparatus for securing a mobile computerized device, such as a mobile phone, to a steering wheel, or to other rotating elements.

BACKGROUND OF THE INVENTION

Users of mobile computerized devices, such as GPS units and mobile phones, desire to secure the mobile computerized devices to various locations in a vehicle, in order to be closer to the devices. Being dose to the device enables the users to better view data on the device, such as maps or messages, and to use the device without an in-car speakerphone.

Some solutions secure the mobile device to the outlet of the vehicle air-condition unit. However, the air-condition is quite distant from the user and this solution only provides securing the mobile device to a single location, such that the mobile device does not fall to the vehicle's floor. There are solutions to secure the mobile device to the steering wheel. However, those solutions fail to keep the mobile device on the upper central portion of the steering wheel once the driver maneuvers the steering wheel to the sides. The mobile device is left at one of the sides of the steering wheel which makes the mobile devices unusable.

SUMMARY OF THE INVENTION

It is an object of the present invention to disclose an apparatus for securing a mobile device to a steering wheel, comprising a main flap connected to a rear surface of the mobile device, said main flap is made of a rigid material; a holder attached to the main flap, said holder secures the mobile device to the main flap; an elliptic unit extending from the main flap and surrounding the steering wheel.

In sortie cases, the holder is a magnet embedded within the main flap.

In some cases, the main flap comprises a niche in which the magnet is located.

In some cases, the apparatus further comprises an elastic pad surrounding the magnet.

In some cases, the holder comprises a gripping unit extending from the main flap, said gripping unit comprises a plurality of arms that limit the movement of the mobile device to a predefined distance from the main flap. In some cases, the plurality of arms extends perpendicularly from a surface of the main flap.

In some cases, the plurality of arms limits the mobile device to fall to one of the sides of the main flap and from falling downwards.

In some cases, the apparatus further comprises a first plate extending from the main flap and connecting the main flap to a proximal end of the elliptic unit and a second plate extending from a distal end of the elliptic unit.

In some cases, the first plate and the second plate are attached using one or more screws.

In some cases, the apparatus further comprises an adjustment unit for adjusting the size of the elliptic unit for various widths of steering wheels, the adjustment unit comprises one or more screws for attaching the first plate and the second plate from the two ends of the elliptic unit.

In some cases, the first plate and the second plate are positioned in parallel.

In some cases, the holder comprises one or more vacuum pads.

It is an object of the present invention to disclose a kit, comprising: a main flap located in proximity to a rear surface of the mobile device, said main flap is made of a rigid material; a first holder attached to the main flap, said holder secures the mobile device to the main flap; an elliptic unit extending from the main flap and surrounding the steering wheel; a second holder attached to the rear surface of the mobile device, said second holder is in contact with the holder.

BRIEF DESCRIPTION OF THE FIGURES

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

The present invention discloses an apparatus for securing a mobile device to a steering wheel. The steering wheel may be a steering wheel of a vehicle or another item maneuvered by a person circularly. The apparatus may also be secured to a bar of another vehicle, such as a bicycle, motorcycle, carriage, kick scooter, treadmill in a gym, and others. The apparatus of the present invention is attached to the upper end of the steering wheel. The apparatus is secured to the steering wheel such that when the driver maneuvers the steering wheel to the sides, the apparatus remains in the upper portion of the steering wheel. The screen of the mobile device is fully available when the mobile device is secured to the apparatus, as opposed to pockets in which the pockets are connected to the steering wheel. The screen may consume almost the entire front surface of the mobile device, such that the apparatus is connected to the rear surface of the mobile device, and in some cases, also to the side walls of the mobile device.

Figure 1A:
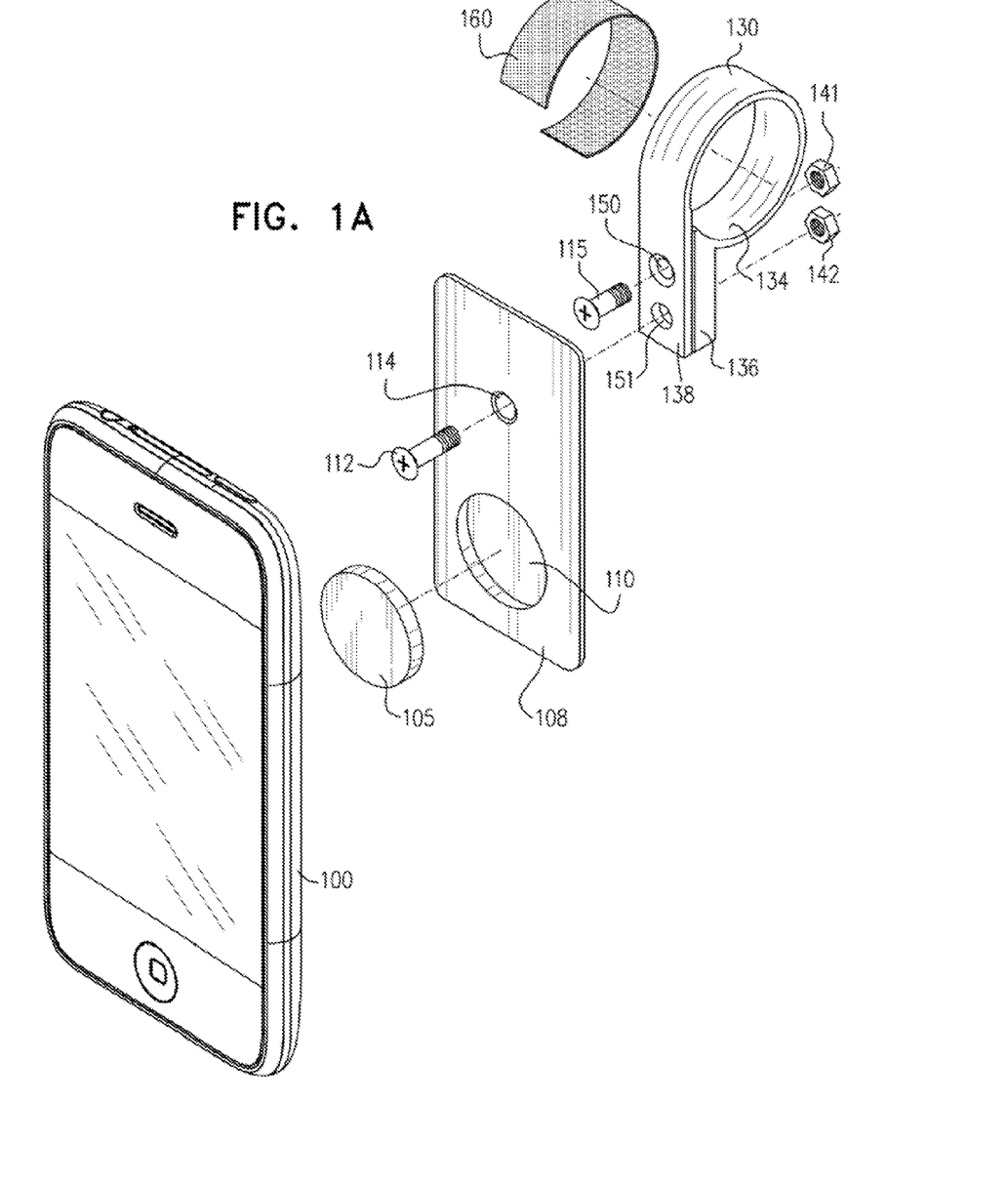
FIG. 1A shows an apparatus for holding a mobile device to a steering wheel using a magnet, according to exemplary embodiments of the subject matter.

FIG. 1A shows an apparatus for holding a mobile device 100 to a steering wheel using a magnet, according to exemplary embodiments of the subject matter. The apparatus comprises a main flap 108, a magnet 105 attached to the main flap 108 and an elliptic unit 130 connecting the main flap 108 to a steering wheel 160 of a vehicle. The main flap 108 is made of a rigid material, while the elliptical unit 130 is made of an elastic or semi-elastic material. The magnet 105 may be embedded in the main flap 108, or inserted into a niche 110 in the main flap 108. The magnet 105 may be of an elliptical or polygonal shape. In case the magnet 105 is elliptical, its diameter's size may vary in the range of 10-40 mm. The magnet 105 is positioned in close proximity to the rear surface of the mobile device 100.

The apparatus may also comprise a first plate 1 38 attached to the main flap 108 and a second plate 136 positioned in parallel to the surface of the first plate 138. The first plate 138 is attached to a proximal end of the elliptical unit 130 and the second plate 136 is attached to a distal end of the elliptical unit 130. The first plate 138 and the second plate 136 are attached to each other by one or more bolts 112, 115 and nuts 141, 142 inserted into holes 114 150, 151 inside the main flap 108, the first plate 138 and the second plate 136, respectively. The nuts and bolts secure the first plate 138 and the second plate 136 to each other; thereby secure the apparatus around the steering wheel 160.

Figure 1B:
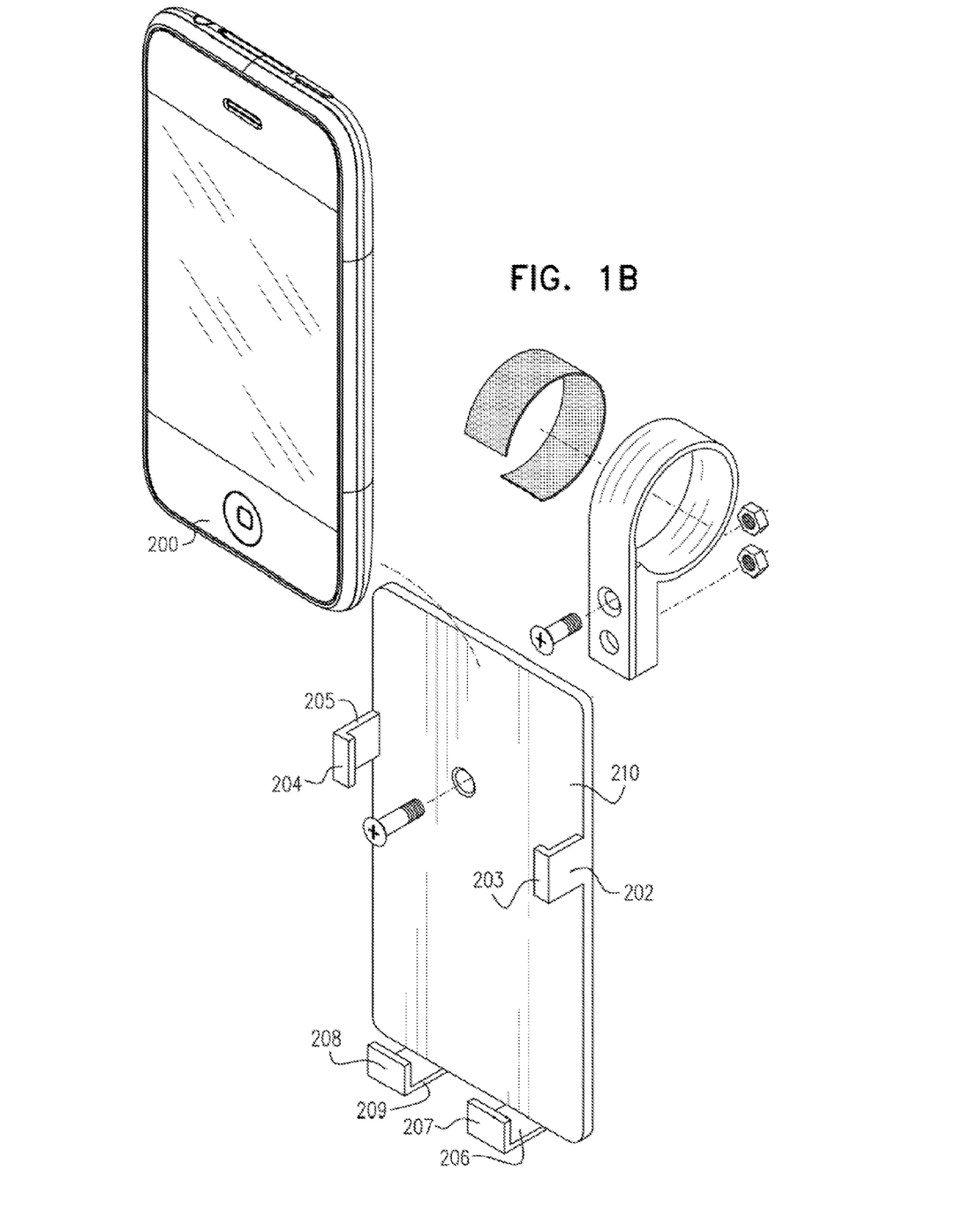
FIG. 1B shows an apparatus for holding a mobile device to a steering wheel using a gripping, unit, according, to exemplary embodiments of the subject matter.

FIG. 1B shows an apparatus for holding a mobile device 200 to a steering wheel using a gripping unit, according to exemplary embodiments of the subject matter. The mobile device .200 is secured to a main flap 210 using a gripping unit that comprises a plurality of arms 202, 205, 206, 209 that limit the movement of the mobile device 200 to a predefined distance from the main flap 210. The main flap 210 is secured to the steering wheel as disclosed in FIG. 1A, The arm 202 extends perpendicularly from the surface of the main flap 210. At least a portion of the plurality of arms 202, 205, 206, 209 are connected to secondary arms that form an angle from the respective arm and limit the movement of the mobile phone 200, thus securing the mobile phone 200 to the main flap 210. The arm 202 is connected to a secondary arm 203 which forms an angle between the arm 202 and the secondary arm 203. The secondary arm 203 limits the movement of the mobile device 200 inside the gripping unit according, to the length of the arm 202. Secondary arm 207 extends from arm 206, Secondary arm 204 extends from arm 205, and Secondary arm 208 extends from arm 209. The size of the plurality of arms 202, 205, 206, 209 may be adjusted to fit various types and sizes of mobile devices.

Figures 2A, 2B:
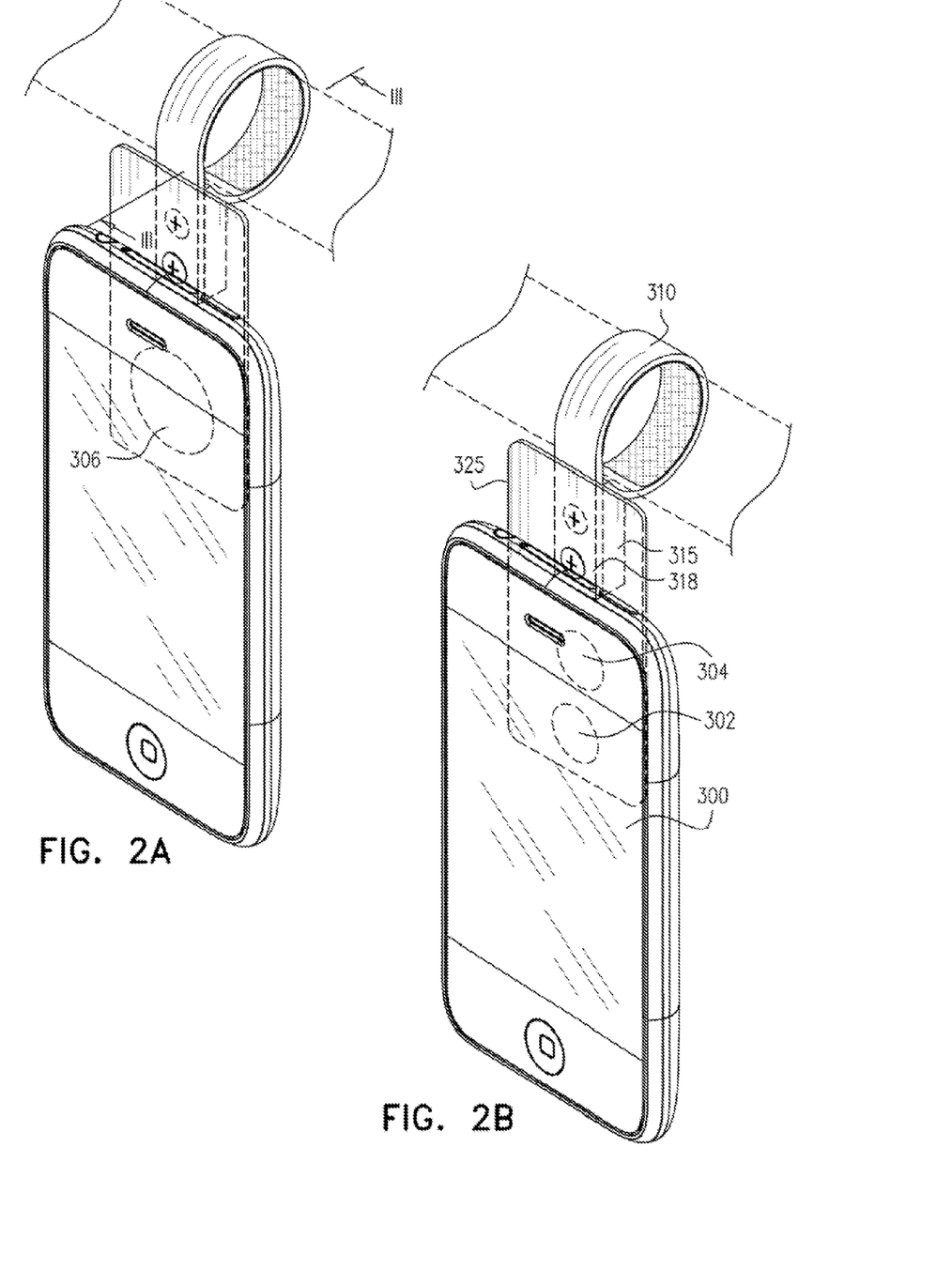
FIGS. 2A-2B show an apparatus for holding a mobile device to a steering wheel using a gripping unit, according to exemplary embodiments of the subject matter.

FIGS. 2A-2B show an apparatus for holding a mobile device 300 to a steering wheel using a gripping unit, according to exemplary embodiments of the subject matter. The mobile device 300 is secured to a main flap 325 using a pair of magnets 302, 304 attached to the main flap 325. The pair of magnets 302, 304 applies a magnetic field on the rear surface of the mobile phone 300, on the opposite side of the display of the mobile phone 300. In an alternative case, only a single magnet 306 is attached to the main flap 325 as an alternative to the pair of magnets 302, 304. The main flap 325 is connected to a first plate 318 connected to a proximal end of the elliptical unit 310 which is connected to a second plate 315 via one or more bolts.

Figure 2C:
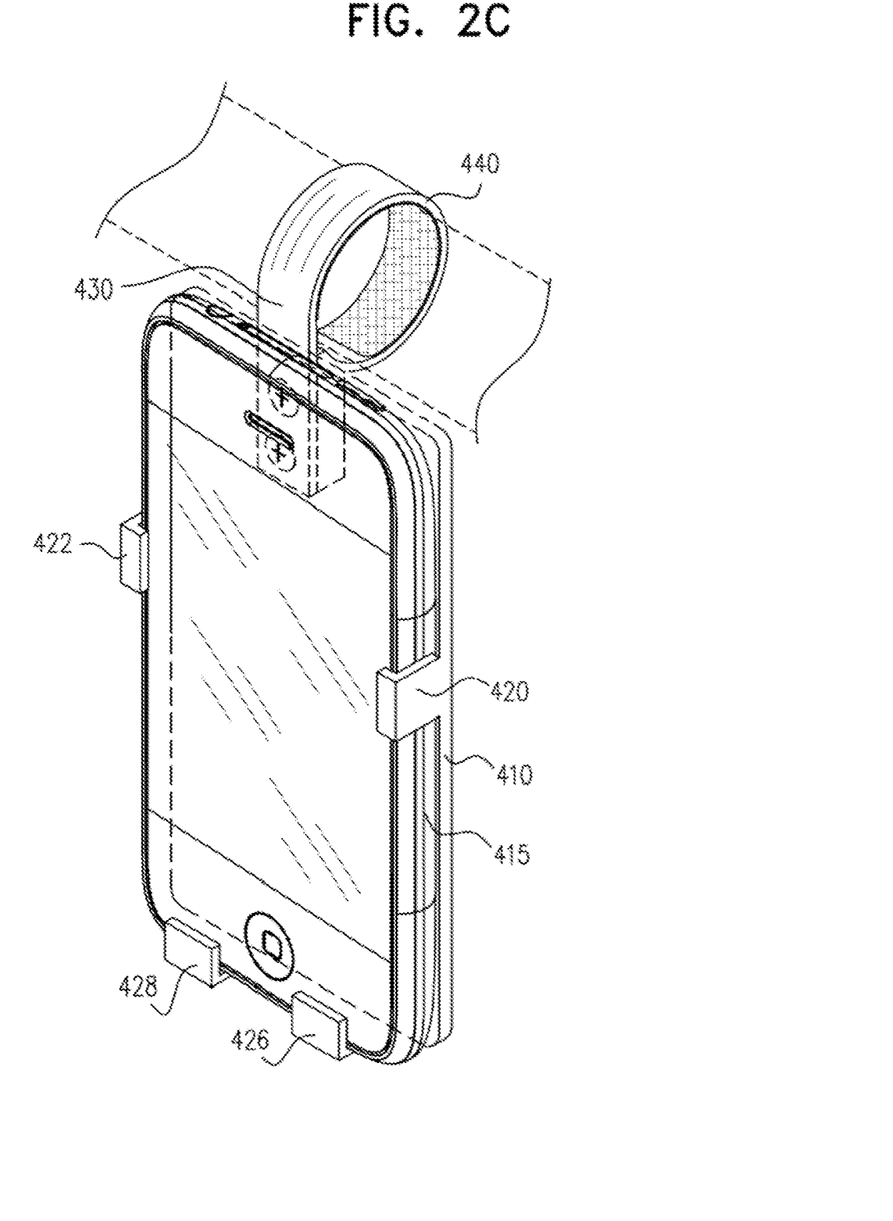
FIG. 2C shows an apparatus for holding a mobile device to a steering wheel using a gripping unit, according to exemplary embodiments of the subject matter.

FIG. 2C shows an apparatus for holding a mobile device 415 to a steering wheel using a gripping unit, according to exemplary embodiments of the subject matter. The mobile device 415 is secured to a main flap 410 using a gripping unit that comprises four arms 420, 422, 426 and 428. Two arms 420, 422 extend from the sides of the main flap 410 and two arms 426, 428 extend from the bottom of the main flap 410. The main flap 410 is attached to a first plate 430 which is connected to the elliptical unit 440.

Figure 3:
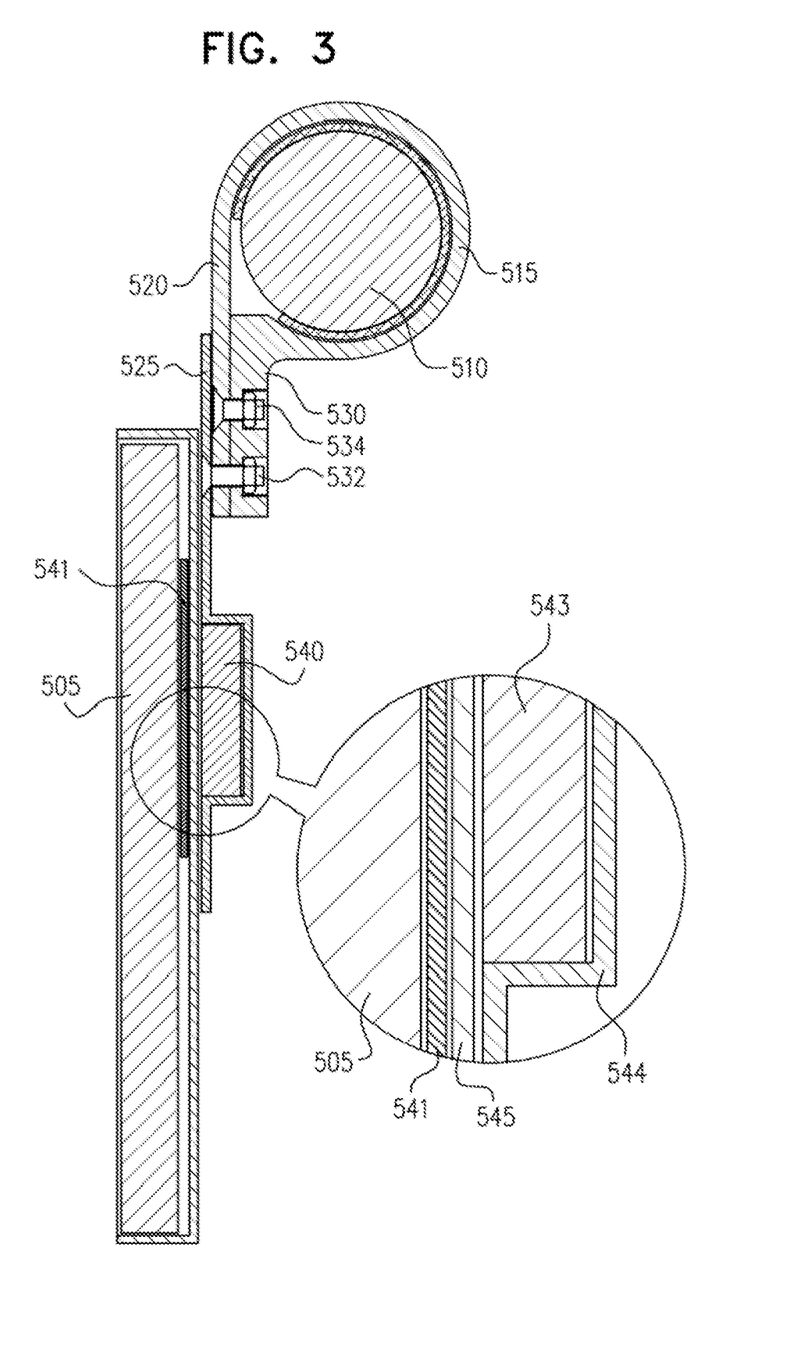
FIG. 3A shows an apparatus for holding a mobile device to a steering wheel using a magnet, according to exemplary embodiments of the subject matter.
FIG. 3B shows a sectional view of an apparatus for holding a mobile device to a steering wheel using a magnet, according to exemplary embodiments of the subject matter.

FIGS. 3A-3B show an apparatus for holding a mobile device 505 to a steering wheel using a magnet, according to exemplary embodiments of the subject matter. A main flap 525 comprises a niche 543 in which a magnet 540 is located. The niche 543 is defined by layer 544 connected to the main flap 525. The magnet 540 applies magnetic field on the rear surface 541 of the mobile device 505, adjacent to the cover of the mobile device 505. The main flap 525 is connected to a first plate 520 connected to a proximal end of the elliptical unit 515 which is connected to a second plate 530 via one or more bolts 532, 534. The elliptical unit 515 is secured around the steering wheel 510.

Figure 4:
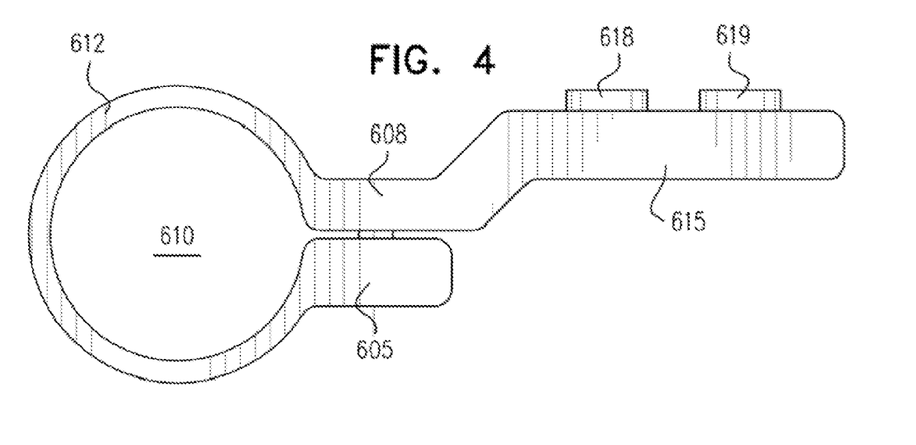
FIG. 4 shows an apparatus for holding a mobile device to a steering wheel using vacuum pads, according to exemplary embodiments of the subject matter.

FIG. 4 shows an apparatus for holding a mobile device to a steering wheel using vacuum pads, according to exemplary embodiments of the subject matter. The vacuum pads 618, 619 are connected to a main flap 615. The main flap 615 is connected to a first plate 608 connected to a proximal end of the elliptical unit 612 which is connected to a second plate 605. The elliptical unit 612 is secured around the steering wheel 610. In some cases, the vacuum is created by rotating the mobile device on top of the main flap. The mobile device is pressed against the vacuum pads 618, 619, and then rotated and the vacuum is created.

Figure 5:
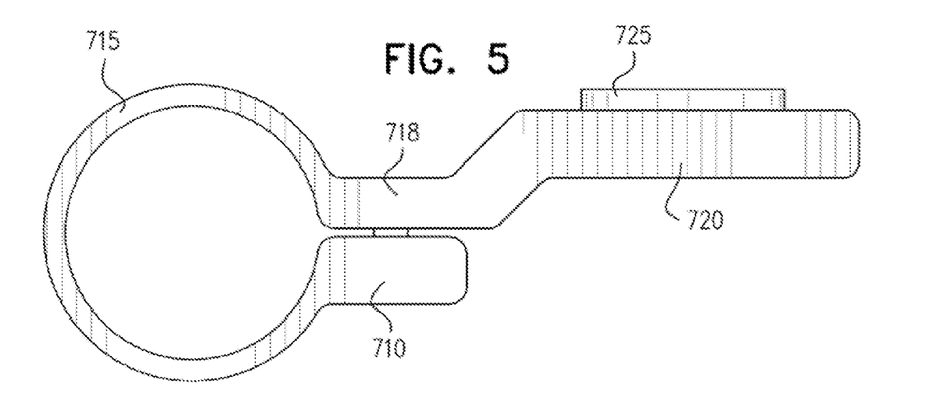
FIG. 5 shows an apparatus for holding a mobile device to a steering wheel using a magnet, according to exemplary embodiments of the subject matter.

FIG. 5 shows an apparatus for holding a mobile device to a steering wheel using a magnet 725, according to exemplary embodiments of the subject matter. The main flap 720 is connected to a first plate 718 connected to a proximal end of the elliptical unit 715 which is connected to a second plate 710.

Figure 6:
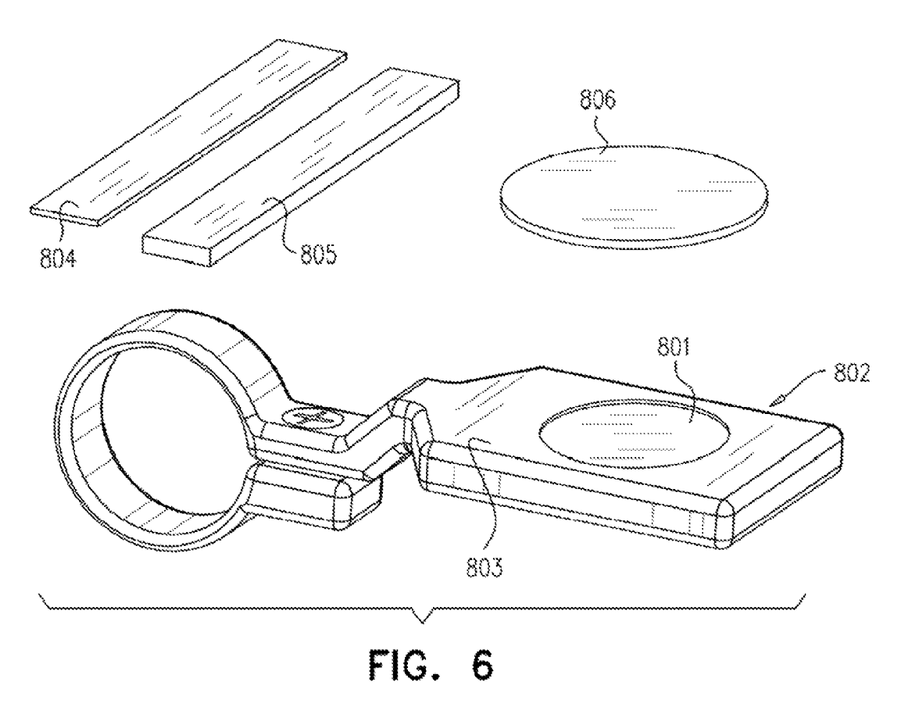
FIG. 6 shows a kit comprising an apparatus for holding a mobile device to steering wheel and a second holder attached to the mobile device, according to exemplary embodiments of the subject matter.

FIG. 6 shows a kit comprising an apparatus for holding a mobile device to a steering wheel and a second holder attached to the mobile device according to exemplary embodiments of the subject matter. The kit comprises a second holder 806 to be attached to the rear surface of the mobile device. For example, the second holder 806 is glued to the rear surface of the mobile device. The second holder 806 is of a coin-like shape, having narrow sidewalls, for example of 0.5-2 mm width. One surface of the second holder 806 is attached to the rear surface of the mobile device and the other surface of the second holder 806 is positioned in proximity to the first holder of the apparatus, for example to the magnet 801. In some exemplary cases, the first holder of the apparatus comprises Velcro, and the other surface of the second holder 806 also contains Velcro to be attached to the first holder 801.

The apparatus comprises a main flap 802 also comprises the first plate. The main flap is attached to an elastic pad 803 in which the magnet 801 is mounted. In some exemplary cases, the elastic, pad 803 is made of sponge, and protrudes to a height of 0.5-3 mm. The magnet 801 is lower than the height of the elastic pad 803, which results in a niche in which the second holder 806 of the mobile device is secured in vacuum. In some exemplary cases, the kit also comprises one or more straps to be strapped around the elliptical unit in order to fit to various sizes of steering wheels. The kit may include two straps, a first strap 804 of 1 mm width and a second strap 805 of 3 mm width.

The invention claimed is:
1. A kit for securing a mobile device to a steering wheel, comprising:

a main flap configured to be located in proximity to a rear surface of a mobile device, said main flap is made of a rigid material;

a first magnetic holder attached to the main flap, said first magnetic holder configured to secure the mobile device to the main flap;

a first plate extending from an edge of the main flap at substantially the same direction of the main flap;

an elliptic unit extending from the first plate and configured to surround at least a portion of a steering wheel; and a second holder configured to be attached to the rear surface of the mobile device, said second holder is in contact with the first holder.

2. The apparatus of claim 1, further comprises an elastic pad surrounding the magnet.

3. The apparatus of claim 1, further comprises an adjustment unit for adjusting the size of the elliptic unit for various widths of steering wheels, the adjustment unit comprises one or more screws for attaching the first plate and the second plate from the two ends of the elliptic unit.

4. The apparatus of claim 1, wherein the first plate and second plate are positioned in parallel.

* * * * *